Nov. 25, 1969  J. M. BASON  3,480,161
MECHANICAL HANDLING APPARATUS
Filed April 11, 1968  14 Sheets-Sheet 13

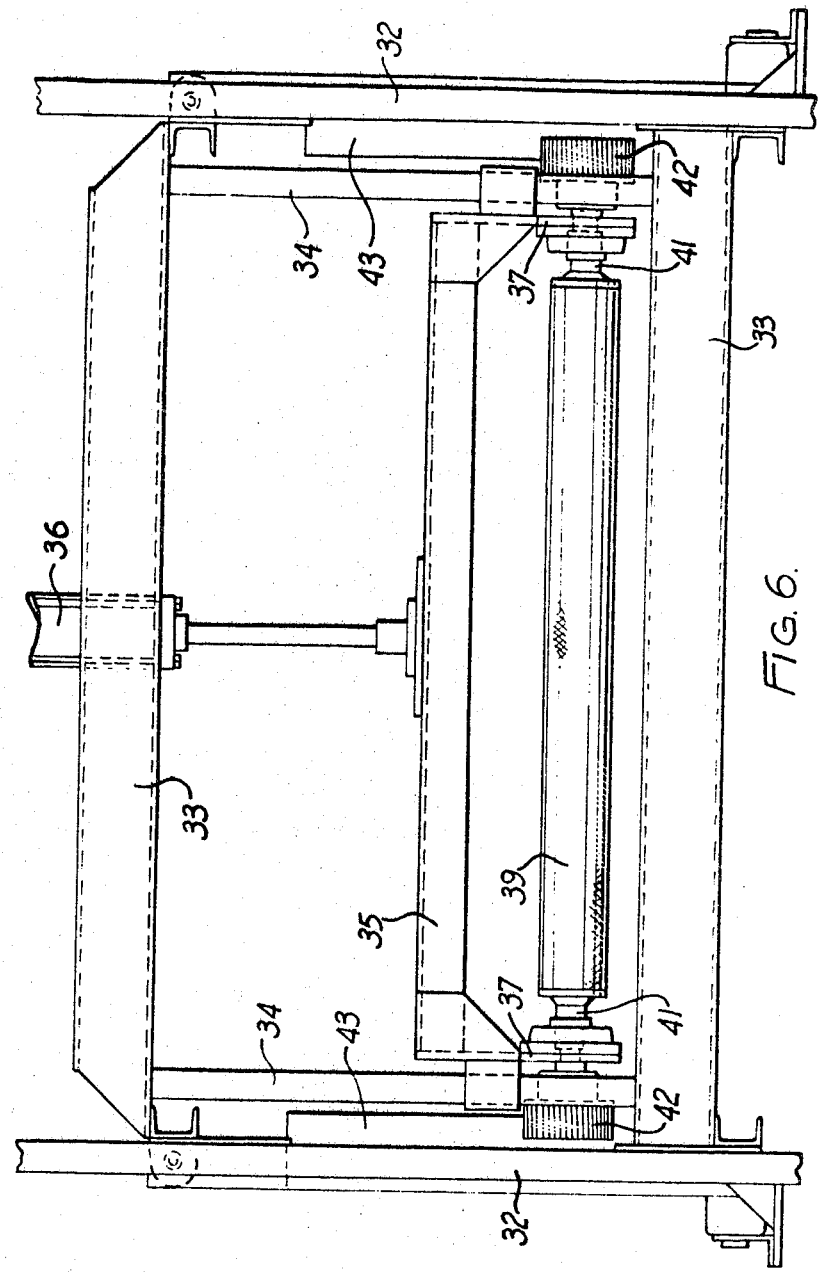

James Munro Bason  INVENTOR:

BY

Bierman & Bierman

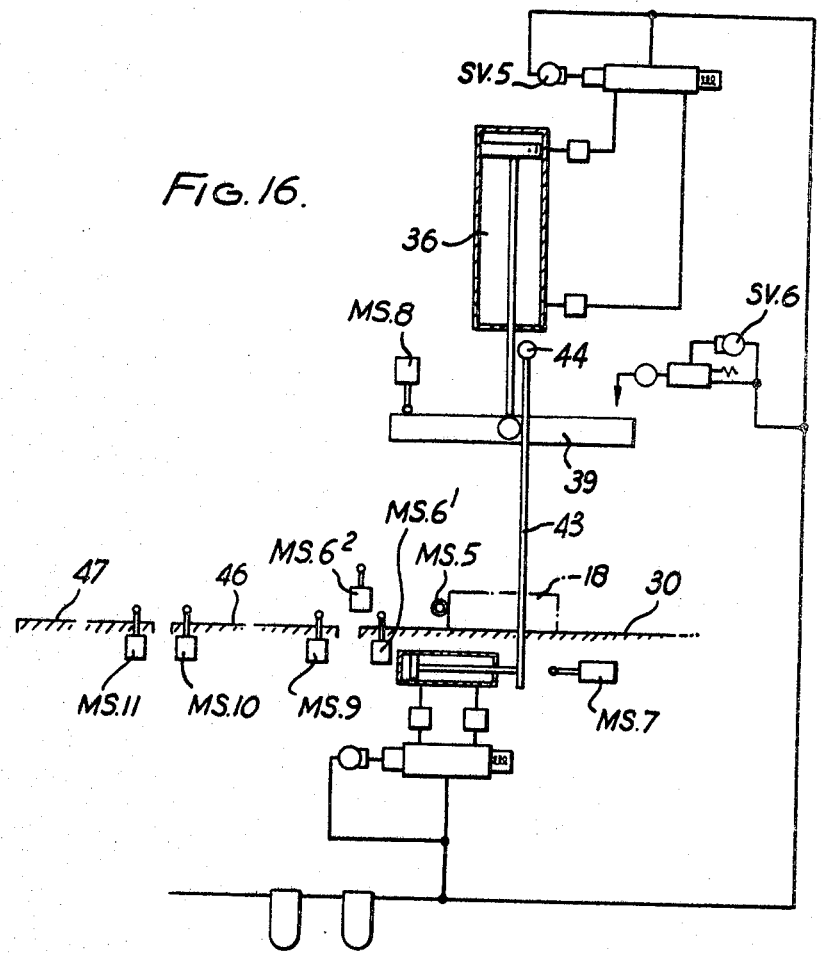

United States Patent Office 3,480,161
Patented Nov. 25, 1969

3,480,161
MECHANICAL HANDLING APPARATUS
James M. Bason, Mobberley, Knutsford, England, assignor to Bason & Sons Limited, a British company
Filed Apr. 11, 1968, Ser. No. 720,529
Int. Cl. B65j 57/16; B66c 1/00
U.S. Cl. 214—6   10 Claims

ABSTRACT OF THE DISCLOSURE

In apparatus for mechanically handling bricks or like articles, the latter are conveyed in side-by-side contact to a first station, where a pusher displaces a predetermined number clear of the conveyor as a single row which is then conveyed to a second station. Here alternate rows of bricks are picked up and each deposited inverted upon the next row to arrive, the resultant double rows of bricks being discharged as formed and marshalled into a pack for removal by a stacker unit. At some stage of the process (e.g. at the first or second station or during engagement by the stacker unit) the bricks in each row are laterally separated whilst being individually gripped.

---

This invention relates to the mechanical handling of bricks and like rectangular block-like articles of uniform dimensions, its object being to provide a simple and reliable apparatus which will enable a row of such articles to be spaced apart laterally and therafter collectively inverted, with the possibility of bringing two such assemblages into face-to-face relation and marshalling the same for collective movement.

Apparatus according to the present invention comprises means for continuously conveying bricks or like articles in side-by-side contact to a first station, pusher means automatically operated to displace clear of said conveyor and as a single row a predetermined number of articles arriving at such station, means for conveying said row of articles to a second station, means automatically operated for picking up and turning over alternate rows of articles arriving at said second station and for superimposing each such inverted row upon the next row to arrive, means for automatically discharging each pair of rows placed face-to-face as aforesaid, and means for marshalling several such pairs for removal as a pack by a stacker unit, in combination with means, arranged in advance of or beyond said turn-over means or incorporated in said stacker unit, whereby the articles in each row are laterally separated whilst individually gripped.

The advancement and retraction of the pusher and pick-up means, the actuation of the latter to invert alternate rows of bricks or the like, the operation of grippers in the separating means to clamp or release the articles in each row and the lateral movement of such grippers to space the clamped articles apart is conveniently effected by fluid-pressure means operating in sequence and in timed relation to the arrival of full complements of such articles at the first station.

When the separating means is arranged in advance of the turn-over means, the grippers thereof may be arranged to clamp more articles than it is designed to space at each operation, the article or articles not moved laterally by such grippers serving to restrain the stream of articles on the feed conveyor, but subsequently forming part of the next complement of articles to be separated.

The pick-up means aforesaid conveniently comprises a gripper head mounted for rotation about an axis parallel to the length of each row of articles to be engaged thereby, and a driving rail automatically engaged with, and then disengaged from, a friction roller on said head during each lifting movement of the latter.

The marshalling means may comprise a conveyor adapted for movement only when a predetermined number of double rows of articles have been conveyed thereto from the turn-over means.

In the accompanying drawings,

FIG. 5 is a detail view showing the method of interconnecting the various grippers shown in FIGS. 2 and 3;

FIGS. 6 and 7 are enlarged front and side elevations, respectively, of the turn-over device shown in FIG. 1;

FIGS. 15 and 16 are diagrams showing the arrangement of the control switches and valves for the apparatus shown in FIGS. 1 to 11.

Figure 1:
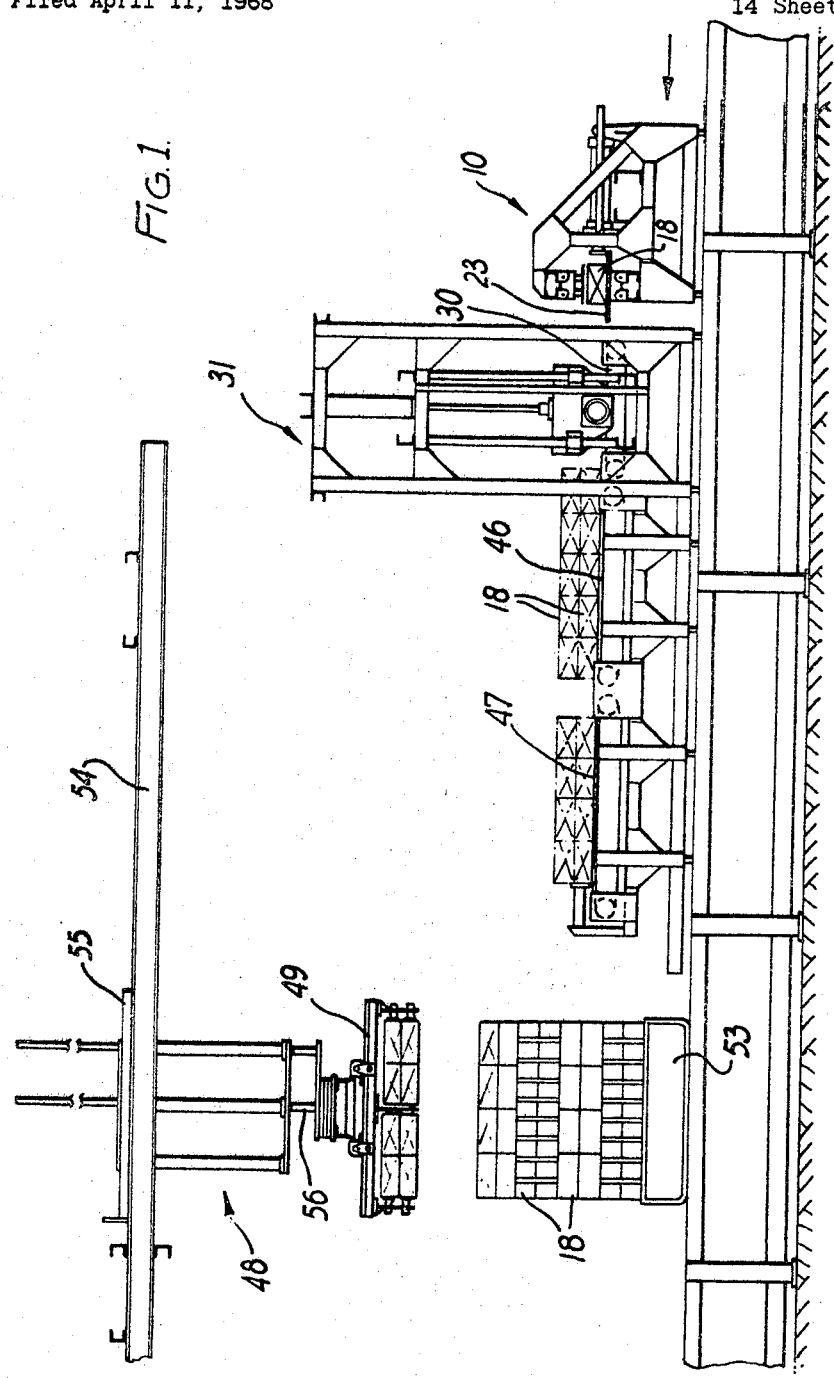
FIG. 1 is a schematic side elevation of one form of apparatus embodying the present invention.

In the example of the apparatus illustrated in FIGS. 1 to 11, the separating device 10 comprises two stationary side frames 11 rigidly connected by horizontal cross-members 12, four of these (indicated at 12′) being channels arranged in vertically spaced pairs, with the upper pair directly above the lower.

Immediately beneath the upper channels 12, and above the lower ones, pairs of guide-bars 13 are fixed in parallel relation to slidably support two sets of (say) eleven grippers 14 each.

Figure 2:
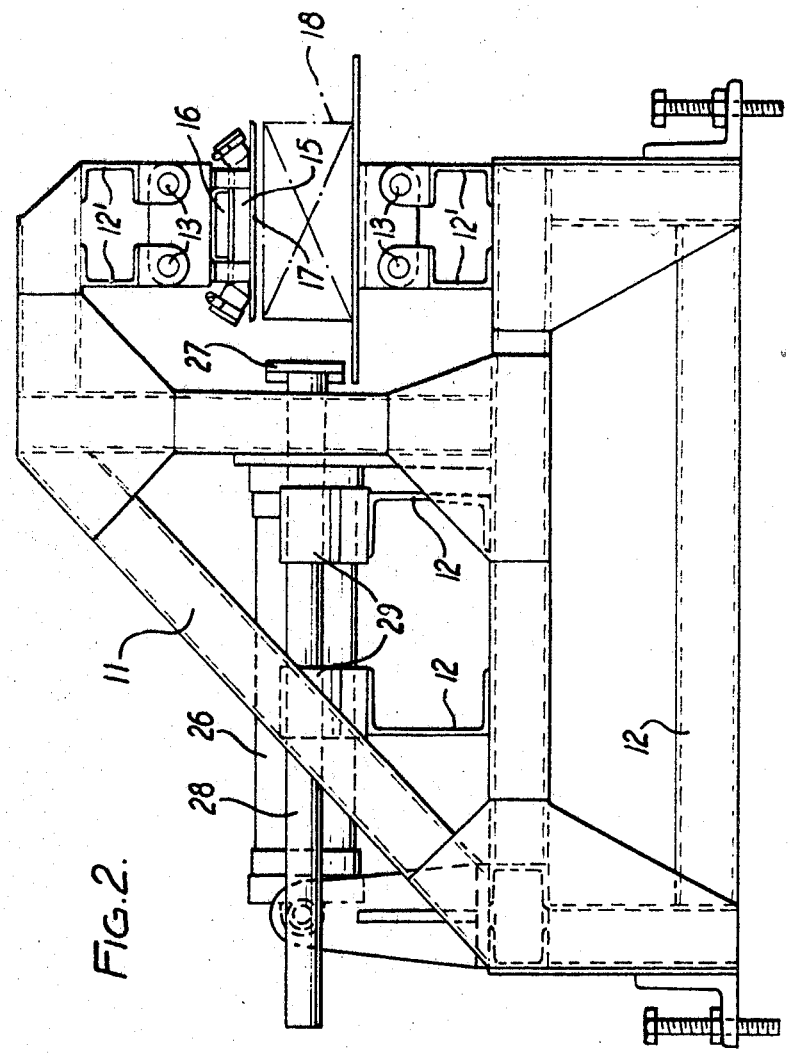
FIG. 2 is an enlarged end elevation of the separating device shown in FIG. 1.
Figure 3:
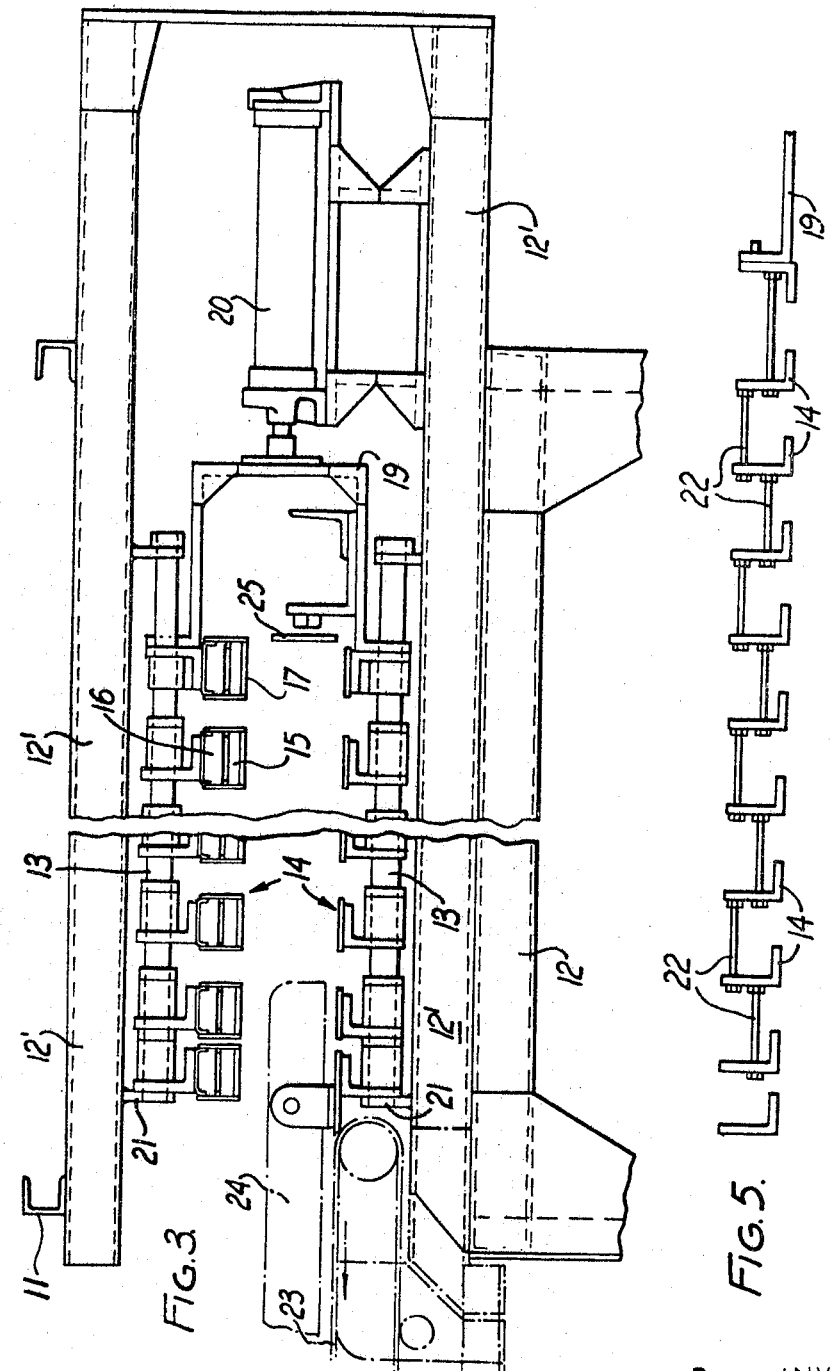
FIGS. 3 and 4 are a side elevation and plan view, respectively of such device.

As shown in FIGS. 2 and 3, each such gripper exactly opposed to its counterpart on the other pair of guide-bars 13 and each of the upper set has an inflatable tube 15 interposed between its body portion 16 and a spring-loaded pressure-plate 17.

These pressure-plates are at all times horizontal and parallel to the corresponding parts of the lower set of grippers 14, being normally sufficiently spaced therefrom to allow the interposition between the several opposed pairs of individual bricks 18 displaced edgewise (i.e. resting upon their side faces).

The grippers 14 at one end of each set are fixed to opposite limbs of a yoke 19 acted on by a double-acting pneumatic ram 20, whose advancement moves all the grippers of each set into mutual contact and into a position defined by abutment of the furthest gripper against a stop 21.

With the exception of this last-mentioned gripper, all those in each set are connected each to the next as shown in FIG. 5, by bolts 22 of such length that, when the pneumatic ram 20 is retracted, the grippers 14 carried thereby drag the connected grippers successively after them until eventually they are uniformly spaced apart.

The bricks 18 to be handled are placed edgewise upon, and transversely of, a feed conveyor 23 which is aligned with the two sets of grippers 14 and has its upper run coplanar with the faces of the lower set.

Figure 15:
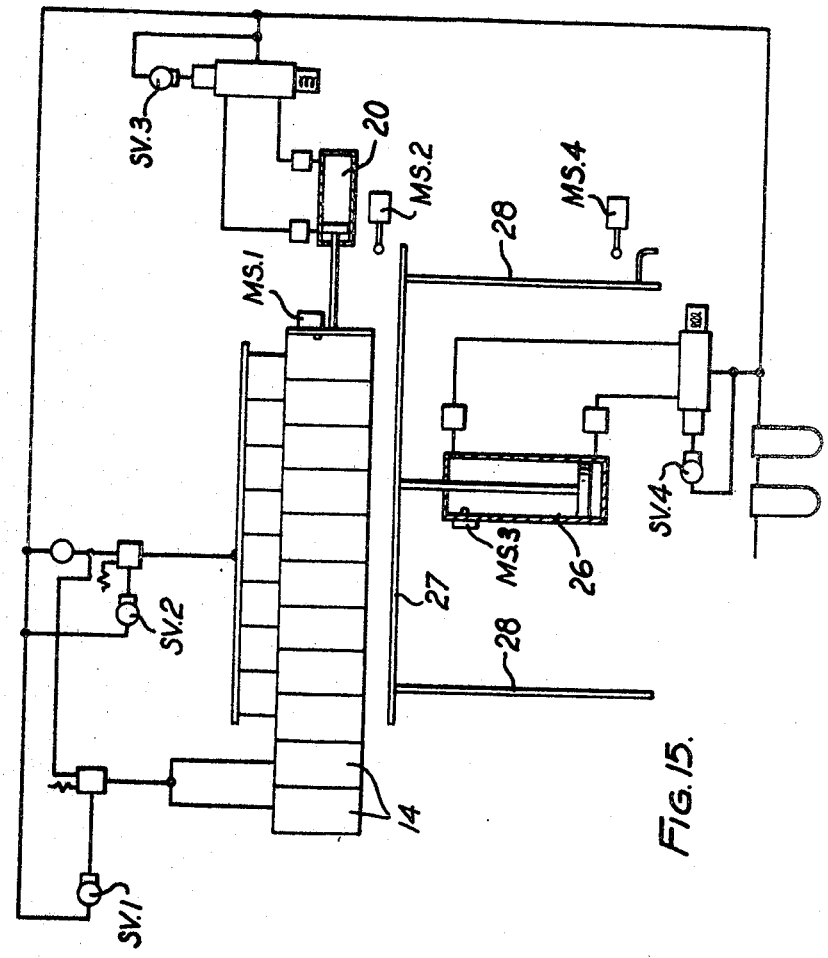

During advancement by this conveyor 23, the bricks 18 are brought into endwise registry by means of guide plates 24, and on reaching the grippers 14 they pass transversely thereof in mutual contact until the leading brick engages a limit switch carried by the yoke 19 and indicated as MS.1 in FIG. 15.

Operation of this switch MS.1 causes automatic valves SV.1, SV.2 to admit compressed air to the inflatable tubes 15 of the grippers 14, so that opposed pressure-plates 17 of the two sets are moved simultaneously towards one another to clamp the individual bricks 18 between them.

Subsequently an automatic valve SV.3 admits compressed air to the ram 20, and retracts the latter so as to cause mutual separation of consecutive grippers 14, as above described. This operation does not, of course, affect the gripper pair furthest from the ram 20 and the length of the connecting bolts 22 is such that there is likewise no lateral movement of the next adjacent pair. In other words, only nine of the eleven bricks 18 are spaced apart, the other two remaining stationary at the feed side of the device.

When the ram yoke 19 has completed its travel, it operates a switch MS.2 to effect release of air from the nine separated grippers 14 and admit compressed air through a valve SV.4 to a second horizontal ram 26 mounted centrally and longitudinally of the separator frame.

Figure 4:
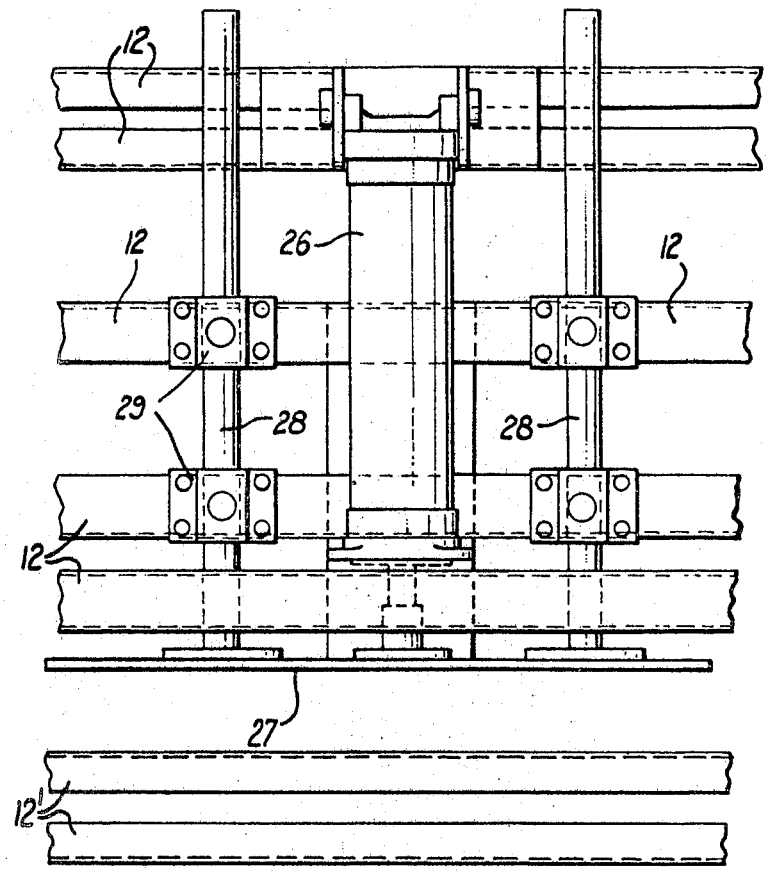

This ram 26 is connected to a vertical pusher plate 27 having parallel guide-bars 28 working in bearings 29 on one of the frame cross-members 11 (see FIGS. 2 and 4). Advancement of such ram causes the pusher plate 27 to move the nine separated bricks 18 simultaneously endwise, and still in spaced-apart condition, onto a further conveyor 30 running transversely of the rows of grippers 14.

On completing its forward stroke the pusher plate 27 operates a switch MS.3 which causes return of the ram 26 to its original retracted position, such return movement in turn operating the valve SV.1 through the medium of a switch MS.4 so that the two grippers 14 left in juxtaposed relation are released, and the bricks 18 previously clamped thereby can be carried across the spacing device by those newly arriving from the feed conveyor 23.

At the same time air is admitted to the spacing ram 20 which advances to bring all the gripper pairs 14 back into mutual contact.

As the bricks 18 reach the conveyor 30, they set the latter in motion by tripping a motor switch MS.4 and are carried forward into a turn-over device 31.

Figure 7:
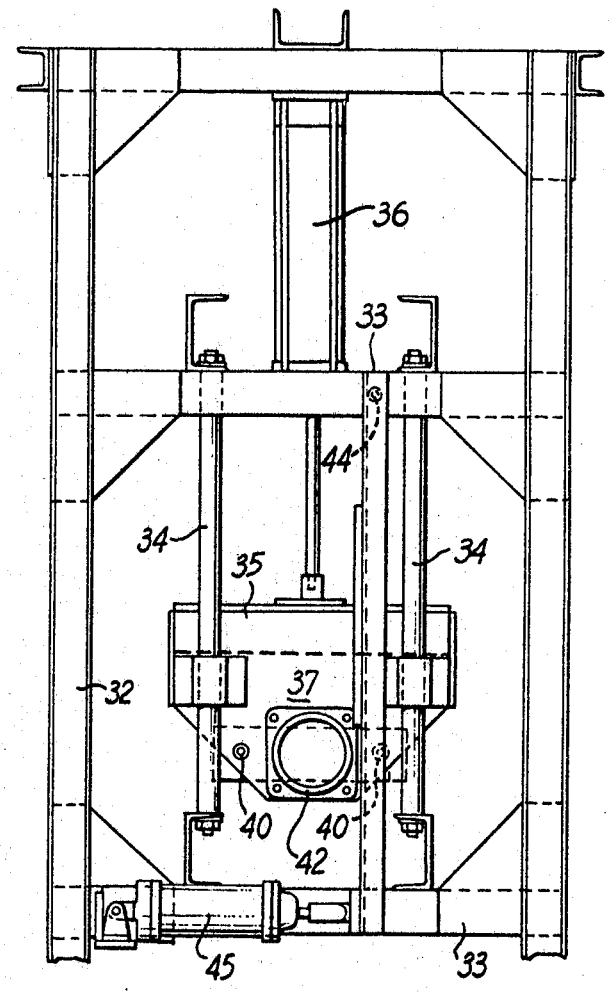
Figure 8:
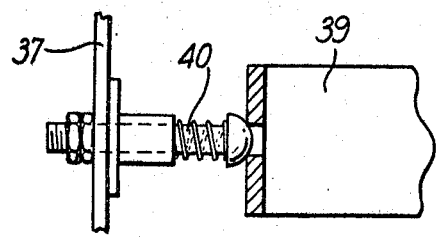
FIG. 8 is a scrap view showing a detail of FIG. 7.
Figure 9:
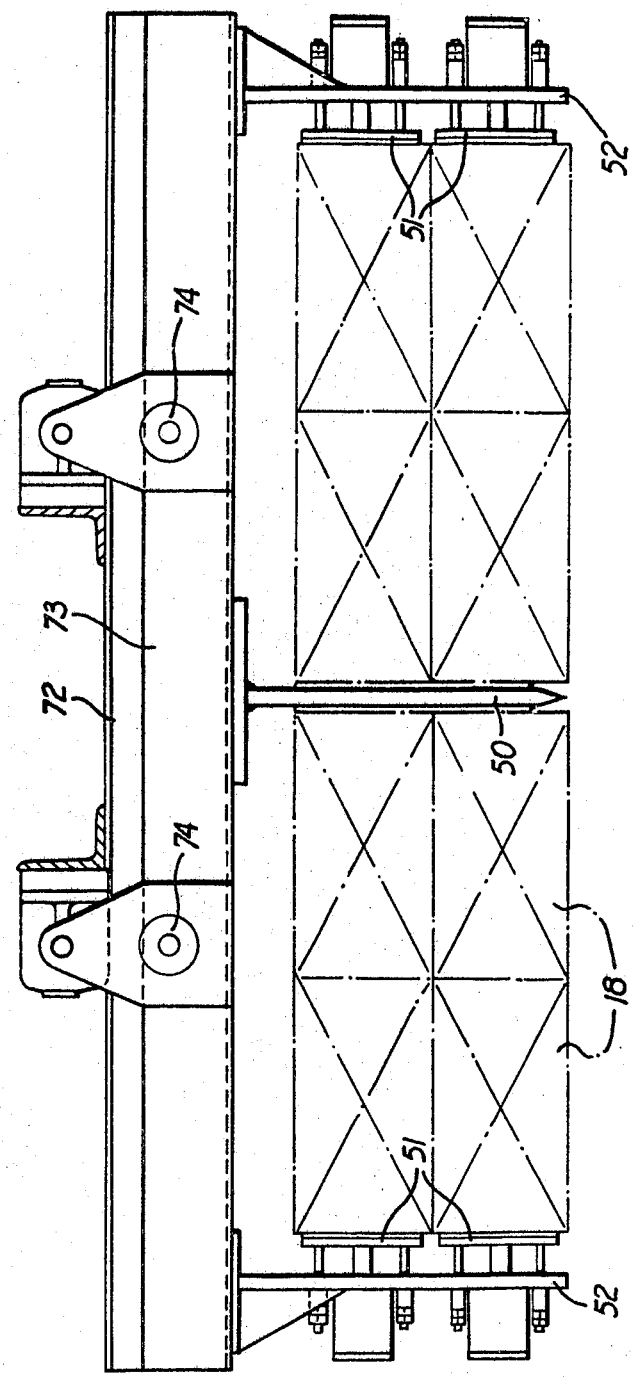
FIGS. 9, 10 and 11 are enlarged side and end elevations and a plan view, respectively, of the pick-up head of the stacking machine shown in FIG. 1.
Figure 10:
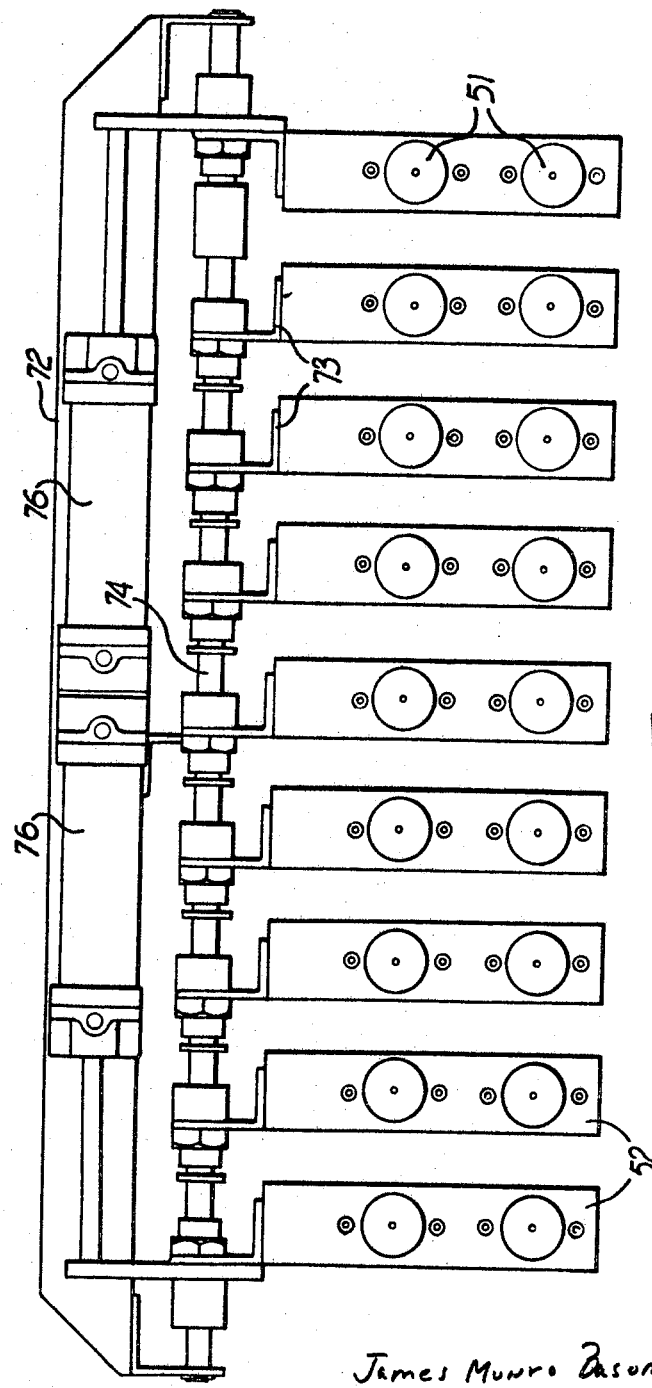
Figure 11:
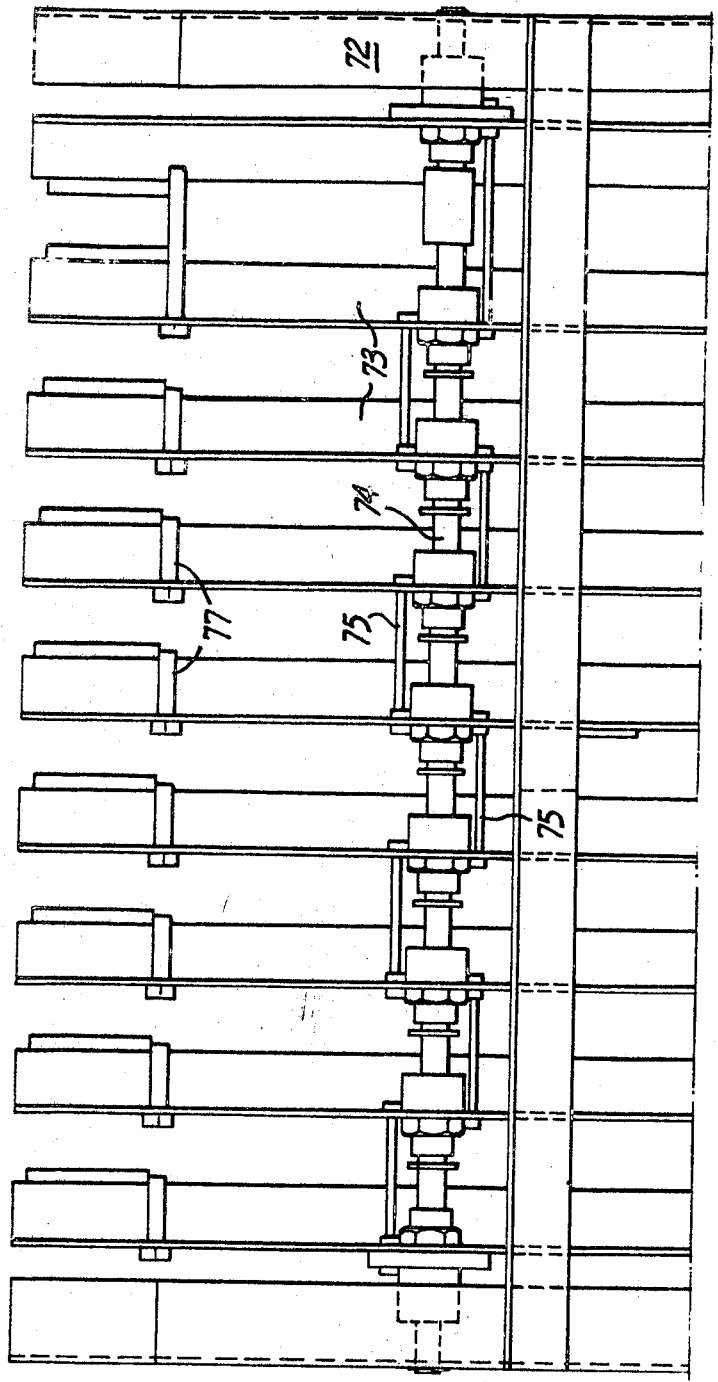

As shown in FIGS. 6 to 8, this latter, like the separating device 10, has stationary side frames 32 fixed to horizontal cross-members 33, upper and lower pairs of which are connected adjacent the end frames 32 by vertical guide-bars 34.

Each pair of guide-bars 34 has slidable thereon the adjacent end of a sub-frame 35 adapted to be raised or lowered by means of a vertical pneumatic ram 36 arranged centrally of the main structure.

Dependent end brackets 37 on this sub-frame 35 have mounted between them, for rotation about a medial horizontal axis 38, a rectangular pick-up head 39 large enough to embrace the row of nine spaced bricks 18 and normally held horizontal by a pair of spring detents 40 (FIG. 8) at opposite sides of one of its trunnions 41.

Arrival of the row of spaced bricks 18 directly beneath the pick-up head 39 is signalled by their interruption of a light-beam incident upon a photo-electric cell MS.5 (see FIG. 16) the latter's response serving to stop the conveyor 30 and to operate a valve SV.5 whereby the pick-up head 39 is allowed to descend around the bricks.

On reaching the conveyor 30 the pick-up head 39 actuates a limit switch MS.6' which causes admission of compressed air through a valve SV.6 to tubes fitted along both sides of such head and adapted on inflation to bring pressure-plates (not shown) into engagement with opposite ends of the several bricks 18, together with reversal of the air supply to the ram 36 at the valve SV.5 so that the sub-frame 35 is raised until friction wheels 42 fixed to both trunnions 41 of the pick-up head 39 have been rotated 180 degrees by contact with driving rails 43 carried by the end frames 32 of the main structure.

These driving rails 43 are pivoted at 44 at their upper ends and immediately the pick-up head 39 has completed its half-revolution (defined by re-engagement of the spring detents 40), a switch MS.7 is operated to open a valve SV.6 whereby air is admitted to small pneumatic rams 45 which act on the lower ends of the rails 43 so as to free the latter from the friction wheels 42.

The bricks 18 remain gripped with their previously-uppermost faces downwards (i.e., the sanded faces in the case of rustic bricks) and elevated above the turn-over conveyor 30 sufficiently to allow the latter subsequently to bring a second row of bricks beneath them from the separating device 10.

The resultant descent of the pick-up head 39 deposits upon this second row of bricks 18 the ones previously inverted, besides operating a further limit switch MS.6² whereby such inverted bricks are released and the pick-up head makes a further lifting movement without rotation, since the driving rails 43 are still held clear of the friction wheels 42.

On completing its upward travel the pick-up head 39 actuates yet another limit switch MS.8 which causes return of the driving rails 43 to their operative positions, and this cycle is repeated indefinitely.

As the next row of bricks 18 leaves the separating device, the two rows superimposed upon the turn-over conveyor 30 are carried forward clear of the pick-up head 39 on to a third conveyor 46, which is automatically started by their operation of a switch MS.9 and when this conveyor 46 has been loaded with a pack of four such transverse double rows of bricks in mutual contact, the first pair of these operates a further switch MS.10 whereby they are collectively carried forward on to a fourth conveyor 47 which serves as the unloading station.

Conveniently the apparatus above described is associated with a stacking machine 48 having a further vertically-movable pick-up head 49 from which depend nine parallel series of vertical plates (see FIGS. 9 to 11), these in any one series being mutually parallel and co-planar with corresponding members of the adjacent series.

The pick-up head 49 is arranged with each of these nine series of plates directly above, and parallel to, one of the longitudinal double rows of bricks 18 on the conveyer 47 when the latter is stopped by the rear end of the pack releasing a switch MS.11. On lowering of the head 49, the central plate 50 of each series penetrates between the second and third pairs of bricks in the adjacent double row, whose front and rear pairs are thereafter each engaged by vertically-spaced air-operated plungers 51 mounted on the end plates 52 of the same series.

In this way the front and rear halves of each double row of bricks 18 are clamped against the adjacent centre plate 50, and simultaneous actuation of all the plungers 51 enables the whole pack of bricks 18 to be gripped as a preliminary to being lifted and moved from the conveyor 47 onto a pallet 53 or trolley.

The stacking machine 48 shown schematically in FIG. 1 includes an overhead track 54 aligned with the conveyors 30, 46, 47 along which is movable a carriage 55 having means whereby the pick-up head 49 is suspended with provision for vertical movement and also for swivelling about a vertical axis 56 to enable each alternate double layer of bricks 18 to be deposited at right angles to the previous pack.

Figure 12:
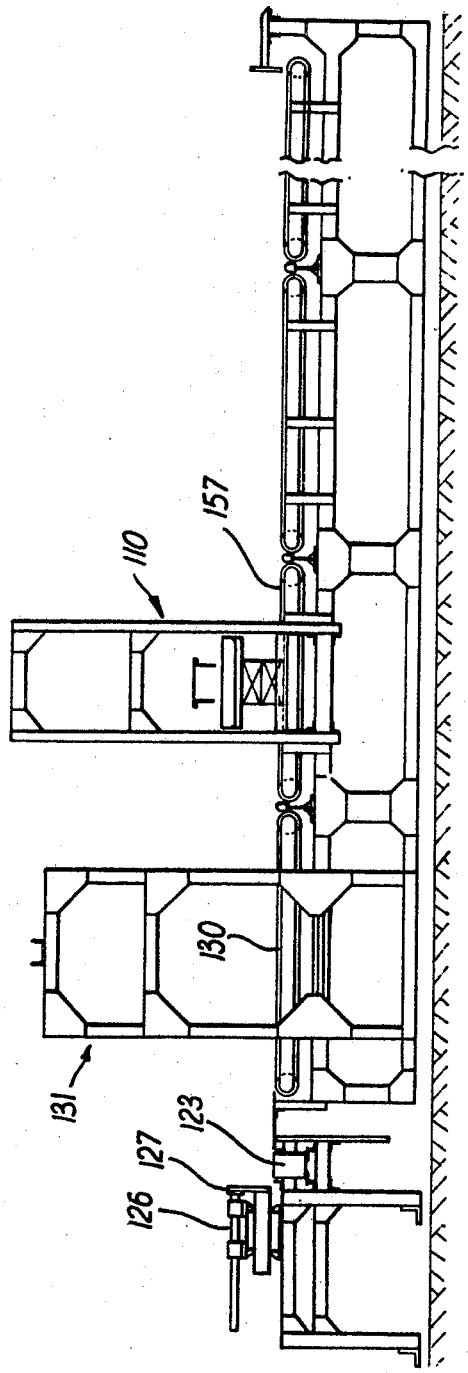
FIG. 12 is a schematic view corresponding to FIG. 1 but showing a modified construction.

In the modified construction shown in FIG. 12 bricks 18 displaced from the feed conveyor 123 by the ram 126 and pusher plate 127 pass directly on to the conveyor 130 of a turn-over device 131, the resultant transverse double rows of bricks (each of which comprises nine or eleven pairs, depending upon the selection made automatically by the pusher unit) then passing on to the conveyor 157 of a separating device 110.

Figure 13:
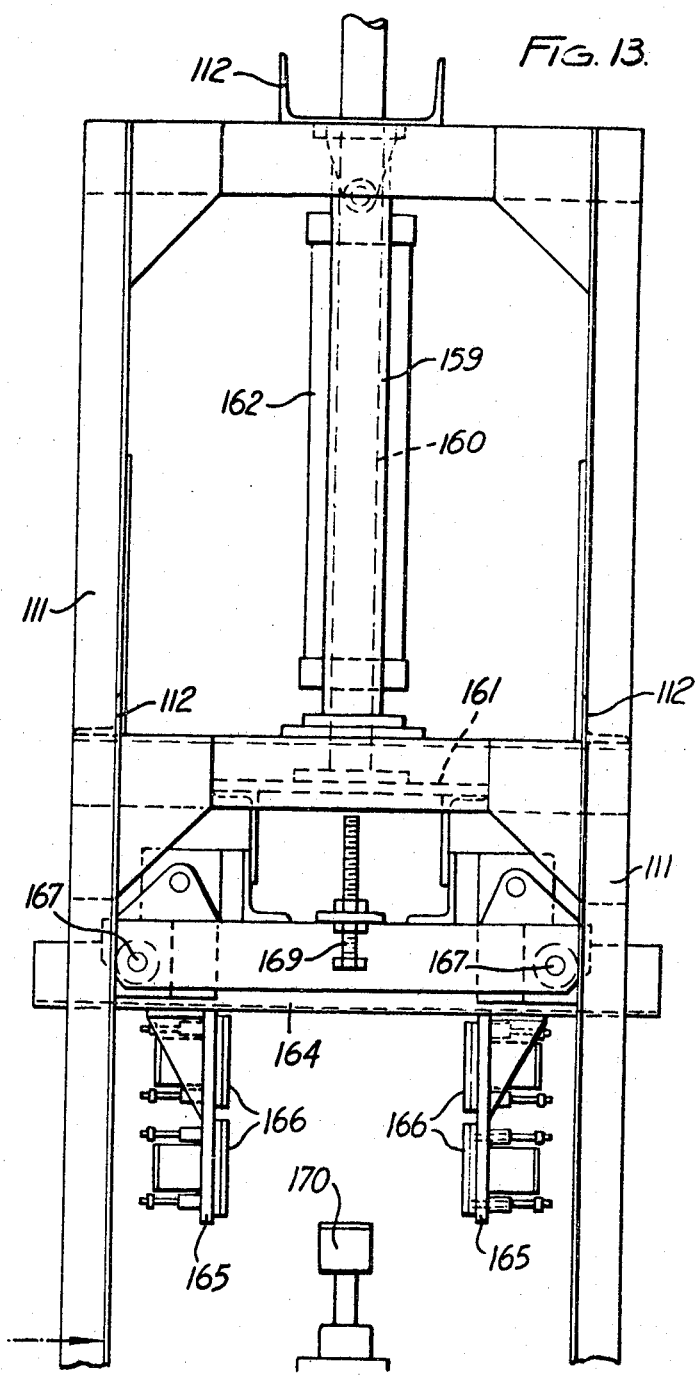
FIGS. 13 and 14 are enlarged side and end elevations respectively of the separating device shown in FIG. 12.
Figure 14:
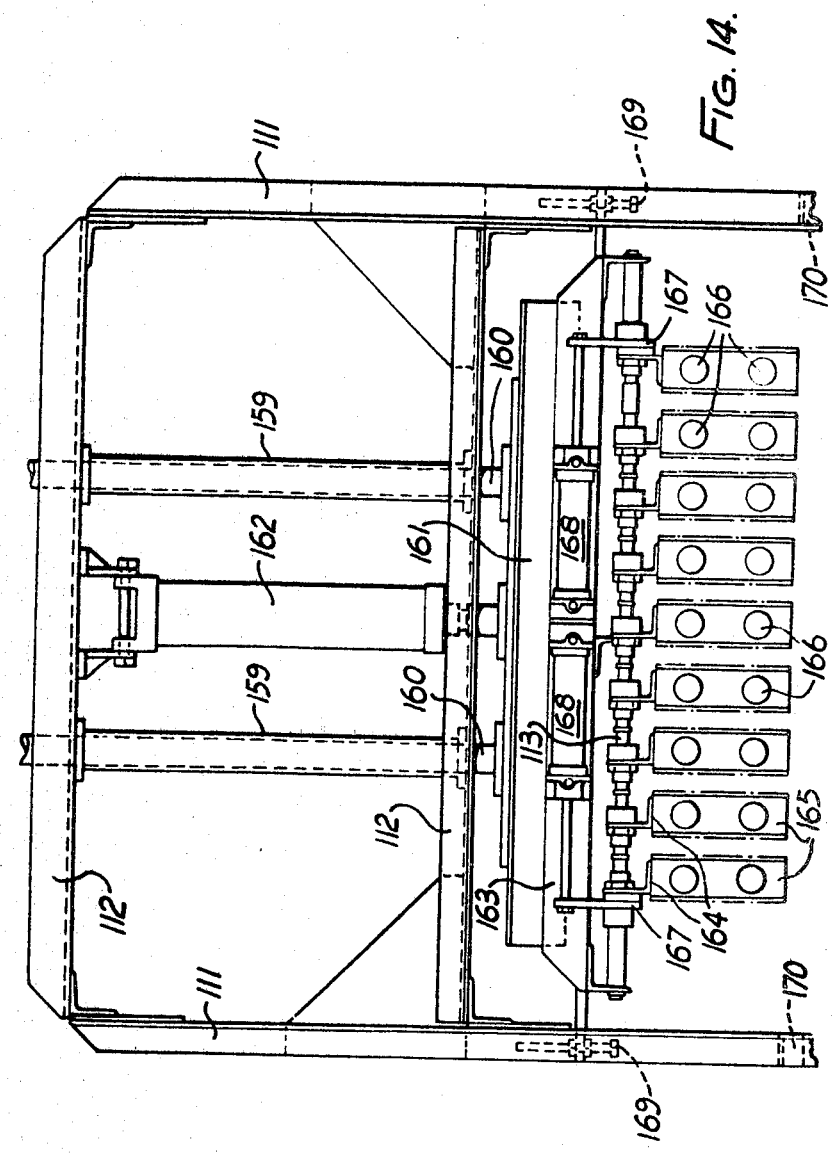

As shown in FIGS. 13 and 14, this comprises two stationary side frames 111 rigidly connected by horizontal cross-members 112, the two uppermost of these carrying vertical guide tubes 159 for rods 160 fixed to a transverse carrier 161 which is capable of being raised and lowered by a central air-operated ram 162.

The carrier 161 in turn supports a rectangular frame 163 which has fixed beneath it, and longitudinally thereof, two parallel horizontal guide-bars 113 slidably supporting a plurality of (say, nine) angle-bars 164.

Mounted beneath each such angle-bar are two opposed brackets 165 each provided with a pair of vertically-spaced air-operated plungers 166 for engaging the adjacent ends of two bricks superimposed as aforesaid. The two endmost angle-bars are fixed to plates 167 simultaneously movable in opposite directions by pneumatic rams 168 on the frame 163, and the several angle-bars are connected each to the next by lost-motion bolts corresponding to those shown in FIG. 5.

The conveyor 157 is halted when each pair of bricks thereon is directly beneath the mid-point of one of the angle-bars 164, and the frame 163 is lowered until adjustable stops 169 thereon engage pneumatic buffers 170 on the side frames 111, the upper and lower plungers 166 being then aligned with the several bricks in the corresponding rows.

The frame 163 is raised to lift the double row of bricks clear of the conveyor 157 and the opposed rams 168 are actuated so that the endmost angle-bars 164 drag the adjacent connected bars successively after them until eventually all such bars are spaced apart at distances determined by fixed stops thereon, the frame 163 then descending and the plungers 166 being retracted to leave the bricks resting upon the conveyor in the same spaced relation.

In a further modification, the bricks pass directly from the turn-over conveyor 130 to the inching conveyors 146, 147 and separation of the longitudinal double rows of the resultant pack is effected after the same has been gripped and raised by the pick-up head 49 of the stacking machine.

For this purpose, such head (see FIGS. 9 to 11) comprises a rectangular frame 72, with nine parallel angle-bars 73 disposed longitudinally thereof and each carrying one of the central plates 50 between end plates 52, the central one of such bars being fixed to the frame whilst the others are slidably mounted upon two transverse guide-bars 74 fixed below the latter.

The several angle-bars 73 are connected each to the next by lost-motion bolts 75 corresponding to those shown in FIG. 5, so that when the pneumatic plungers 51 on the end plates 52 have been actuated to clamp half-rows of bricks against the central plates 50, and pneumatic rams 76 on the frame 72 have been operated to move the end plates 52 in opposite directions, each of the endmost angle bars 73 will drag the adjacent connected bars successively after it until eventually all such bars are spaced at equal distances apart which are determined by stops 77 thereon.

The progressive collection of double rows of bricks by the conveyor system just described has the advantage of allowing adequate time for unloading despite a much higher through-put rate than is practicable with known handling apparatus of the same type.

I claim:

1. Apparatus for the mechanical handling of uniform rectangular block-like articles comprising means for continuously conveying said articles in side-by-side contact to a first station, pusher means automatically operated to displace clear of said conveying means, and as a single row a predetermined number of said articles arriving at said first station, means for conveying each said row of articles to a second station, means automatically operated for picking up and turning over every other one of said rows and superimposing it upon the next of said rows to arrive at said second station, means for automatically discharging each pair of rows placed face-to-face as aforesaid, means for marshalling several such pairs of rows to form a pack, and a stacker unit for removing and stacking said pack, in combination with means for individually gripping and laterally separating the articles in each of said rows.

2. Apparatus as claimed in claim 1, wherein said gripping and separating means is arranged at said first station.

3. Apparatus as claimed in claim 1, wherein said gripping and separating means is arranged at said second station.

4. Apparatus as claimed in claim 1, wherein said gripping and separating means is incorporated in said stacker unit.

5. Apparatus as claimed in claim 1, wherein the operation of said pusher and pick-up means, the actuation of said pick-up means to invert every other one of said rows of articles, and the operation of said gripping and separating means is effected by fluid-pressure means acting in sequence and in timed relation with arrival of full complements of said articles at said first station.

6. Apparatus as claimed in claim 1 and wherein said gripping and separating means is located at said first station and so arranged as to grip more of said articles than it is desired to separate at each operation, the articles not moved by said separating means first serving to restrain further delivery of such articles by said conveying means and subsequently becoming included in the next complement of such articles presented for separation.

7. Apparatus as claimed in claim 1, wherein said gripping means includes parallel guide-bars, grippers mounted on said bars in opposed pairs, spring-loaded pressure plates arranged one in each gripper, and inflatable tubes acting on said pressure plates individually.

8. Apparatus as claimed in claim 1, wherein said gripping means includes parallel guide-bars, grippers mounted on said bars in opposed pairs, spaced pressure plates in each gripper for engaging adjacent ends of two of said articles in superposed relation, and pneumatic rams acting on said pressure plates.

9. Apparatus as claimed in claim 1, wherein said pick-up means includes a gripper head rotatable about an axis parallel to the length of each row of said articles to be engaged thereby, a friction roller fixed to said gripper head, and a driving rail temporarily engaged by said roller during each lifting movement of said gripper head.

10. Apparatus as claimed in claim 1, wherein said marshalling means includes a conveyor adapted for movement only when a predetermined number of double rows of said articles has been delivered thereto from said turn-over means.

References Cited

UNITED STATES PATENTS

| 2,955,717 | 10/1960 | Segur et al. | 214—6 |
| 2,961,810 | 11/1960 | Johnson et al. | 214—6 X |
| 3,109,543 | 11/1963 | Fingerut | 214—6 |
| 3,267,531 | 8/1966 | Buttkereit et al. | 214—6.5 X |
| 3,388,815 | 6/1968 | Lingl | 214—6 |
| 3,402,834 | 9/1968 | Kelsey | 214—6 X |

GERALD M. FORLENZA, Primary Examiner

R. J. SPAR, Assistant Examiner

U.S. Cl. X.R.

94—63; 214—1, 6.5